(12) United States Patent  
Sayeedi

(10) Patent No.: US 7,539,171 B2  
(45) Date of Patent: May 26, 2009

(54) PACKET DATA SERVING NODE INITIATED UPDATES FOR A MOBILE COMMUNICATION SYSTEM

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 523 days.

(21) Appl. No.: 11/333,866

(22) Filed: Jan. 17, 2006

(65) Prior Publication Data

US 2006/0126589 A1 Jun. 15, 2006

Related U.S. Application Data

(63) Continuation of application No. 10/497,869, filed on Jun. 7, 2004, now Pat. No. 7,043,249.

(51) Int. Cl.
*H04Q 7/24* (2006.01)

(52) U.S. Cl. .............. 370/338; 370/395.2; 455/436; 455/445; 455/412; 455/522

(58) Field of Classification Search ........... 370/338, 370/395.2, 335; 455/445, 422.1, 436, 438, 455/439, 442

See application file for complete search history.

(56) References Cited

U.S. PATENT DOCUMENTS

2001/0050907 A1\* 12/2001 Madour et al. ............. 370/329
2003/0054823 A1\* 3/2003 Choi et al. .................. 455/436

\* cited by examiner

*Primary Examiner*—David Q Nguyen

(57) ABSTRACT

A packet data serving node (106) initiates a packet data session update procedure with the RAN by passing a session update message containing packet data session parameters associated with at lease one packet data service) to a packet control function (111) which may be part of a radio access network (110). The session parameter may include a packet data service inactivity timer, QoS parameters, user information or any other session related parameters. Packet control function (111) examines the PSDN code and inhibits tearing down the link (A10/A11) between PCF (111) and PDSN (106). Further, if a handoff occurs, the BS passes the packet data session parameters associated with each of the service instances to the MSC that in turn passes them on the target BS of the handoff.

9 Claims, 3 Drawing Sheets

| 0 | 1 | 2 | 3 | 4 | 5 | 6 | 7 | OCTET # |
|---|---|---|---|---|---|---|---|---|
| IF (APPLICATION TYPE 06H (PDSN CODE)}6: | | | | | | | | K |
| APPLICATION SUB TYPE=[01H] | | | | | | | | K+1 |
| APPLICATION DATA (PSDN CODE=20H) | | | | | | | | K+2 |
| APPLICATION TYPE=06H:ELSE IF(APPLICATION TYPE=07H(SESSION PAR.) | | | | | | | | L |
| APPLICATION SUB TYPE=[01H] | | | | | | | | L+1 |
| APPLICATION DATA (RC-PDSDT) REALM DORMANCY TIMER VALUE | | | | | | | | L+2 |
| APPLICATION TYPE=07H | | | | | | | | |

205
207
209

200

PACKET DATA SERVING NODE INITIATED UPDATES FOR A MOBILE COMMUNICATION SYSTEM

BACKGROUND OF THE INVENTION

The present invention pertains to mobile communications and more particularly to the transfer of packet data parameters during a packet data communication session.

A mobile station (MS) couples through a radio access network (RAN) and a packet data serving node for access to packet data applications such as email, streaming video or web browsing packet data services. A packet data inactivity timer is associated with the various packet data services, supported by the network. When the packet data inactivity timer associated with one of the active service instances expires, the BS transitions the packet data service state from the active/connected state to a dormant state by releasing any traffic channels associated with the call.

The 3GPP2/TSG-S Standards Development Organization recently approved the use of a realm configured packet data session dormancy timer feature (RC-PDSDT). This allows the packet data inactivity timer to be configured by the type of packet application in use, the Quality of Service assigned to the service, user profile information, or other session related parameters. The inactivity timer is stored on a AAA server (Authentication, Authorization and Accounting) in the packet data network.

In order to support the AAA based inactivity timer feature, the base station controller needs the packet data service inactivity timer once the service type is determined. The AAA server uses the information received during the packet data call setup to obtain the associated packet data inactivity timer from the AAAL database.

In the current IS-2001 (IOS) specification, it is not possible for the packet data serving node to initiate transfer of any packet data parameters or information to the radio access network during an active or a dormant packet data session. The IOS standard currently does not support any procedure that can support this feature or any other feature which requires a transfer of packet data session parameters to the RAN. The only current operation of the PDSN is to initiate a release of an active or dormant packet data service. The PDSN initiates this release procedure by sending an update message to the packet control function (PCF). This is the only use of the update message currently approved by the IOS standard.

Accordingly, it would be highly advantageous for a PDSN to initiate a transfer of any packet data parameters required to support a packet data from call to the radio access network without completely tearing down the connection between the packet data serving node (PDSN) and the radio access network under current IS2001 IOS standards.

DESCRIPTION OF THE PREFERRED EMBODIMENT

The packet data inactivity timer is a timer which is used to measure the duration of inactivity of a packet data service instance. Delay sensitive applications such as streaming video for example may require a relatively small inactivity timer value. Other less delay sensitive applications such as email access or web browsing may require a relatively longer packet data inactivity timer. For the case a packet data session is supporting multiple service instances at a given time.

Figure 1:
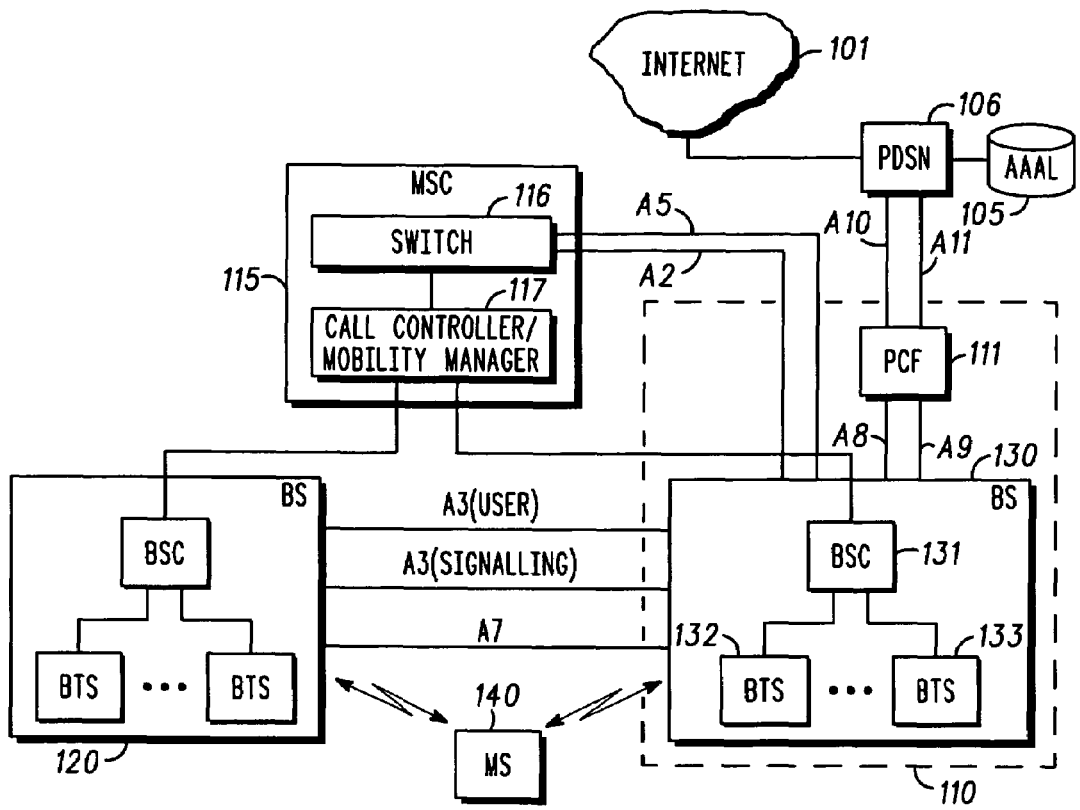
FIG. 1 is a block diagram of a mobile communication system in accordance with the present invention.

FIG. 1 is a block diagram depicting a mobile communication system 100 in accordance with a preferred embodiment of the present invention. Preferably, communication system 100 is a system in accordance with the well-known Telecommunications Industry Association/Electronic Industries Association Interim Standard 2001-A (TIA/EIA IS-2001 IOS).

System 100 comprises mobile network equipment and a mobile communication unit. The mobile network equipment, or communication infrastructure, comprises base stations (BSs) 120 and 130, mobile switching center (MSC) 115, packet control function (PCF) 111, and packet data serving node (PDSN) 106. PCF 111 and base station 130 comprise a Radio Access Network (RAN) 110.

As is well-known in the art, a base station BS comprises a base station controller BSC 131 and one or more base transceiver systems (BTSs) 132, 133. A mobile switching center (MSC) 115 comprises a switch 116 and a call controller/mobility manager 117. The communication infrastructure is also preferably networked to the Internet 101 via PDSN 106 or alternatively networked to some other internet or intranet (not shown).

AAAL (Authentication Authorization Accounting Local) server is coupled to PDSN 106 and provides storage for various parameters including inactivity timers and other packet data session parameters, and user profile information required by the system to support packet data calls. Mobile station 140 preferably comprises a CDMA-capable mobile device that communicates with BS 120 and 130 via the CDMA2000 (TIA/EIA/IS-2000) or HRPD wireless air interfaces (TIA/EIA/IS-856: CDMA2000 High Rate Packet Data Air Interface Specification). This mobile device can be a cell phone, pager and internet capable device or any combination of these functions. For simplicity, only two BSs and one MS are shown in FIG. 1.

Figure 2:
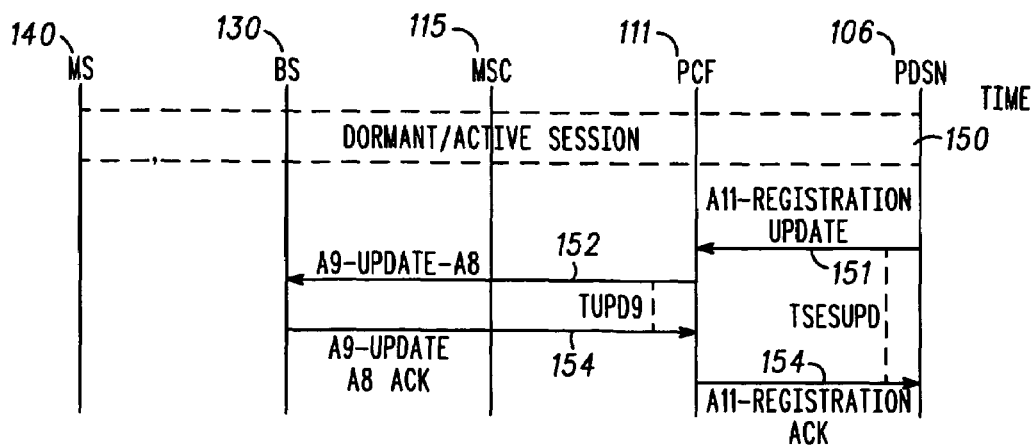
FIG. 2 is a message flow diagram in accordance with a preferred embodiment of the present invention.

The present invention is preferably implemented using software techniques and technologies well-known in the art. In the preferred embodiment, the present invention is implemented in software stored on the memory devices and executed by processors of the MSC 115, BSC 131, PDSN 106 and PCF 111. For example, the method described relative to FIG. 2 is preferably implemented in PSDN, PCF, and BS software.

Typically, mobile station or device 140 couples through base station 130, through PCF 111, through PDSN 106 to internet 101. In accomplishing these links, signaling information is transmitted via the A9 and A11 links between base station controller 131. Further, link A8 is established between base station 130 and PCF 111 for bearer traffic. Link A9 between base station 130 and PCF 111 is used for signaling information. Further links are established between PCF 111 and PDSN 106. Link A10 is set up between PCF 111 and PDSN 106 for bearer traffic and similarly, link A11 between PDSN 106 and PCF 111 is used for signaling information. Bearer traffic may now flow between mobile station 140 and the internet 101.

In the present IS-2001 IOS standards, sending of the current signaling message from the PDSN to the PCF during an existing packet data connection (dormant or active) will result in the release of the A8 and A10 bearer connection. In a preferred embodiment, the PDSN 106 will obtain the inactivity timer associated with the packet data service instance, and transmit it to base station 130. If more than one service instance is active, the packet data session at BS 130 will transition to dormant when the last inactivity timer expires. If done under the present IOS standards, link A10 will immediately be torn down when the message is sent. Therefore, in a preferred embodiment, an A11 registration update message will be modified to transfer session parameters such as the inactivity timers, quality of service parameters (QoS), or any other session related parameters requiring transfer from the PDSN to the PCF 111 and base station 130, and be able to indicate whether the message is used to release or update the packet data session.

The AAA based inactivity timer feature provides the communication system operator with the capability to enhance the efficiency of the Radio Access Network (RAN) 110 radio resources by providing a mechanism to statically configure the packet data session inactivity timer value based on the realm, application, or QoS parameters or associated with the service instance. The inactivity timer associated with the packet data connection is used by the serving BS 130 to transition the corresponding packet data session to the dormant state after it expires. If the mobile station 140 is supporting multiple active packet data services, the entire packet data session transitions to the dormant state when the last inactivity timer expires. If an inactivity timer associated with the packet data connection is unavailable or not passed by PDSN 106, a pre-provisioned default inactivity timer at the BS shall be used.

Referring to FIG. 2, mobile station 140 may be in a dormant or active session 150. In a preferred embodiment of the invention, PDSN 106 will send a message 151 (All-Registration Update) to PCF 111 to indicate the value of a packet data inactivity timer, QoS parameters, other session related parameters, or user profile information. Typically, transmission of message 151 from PDSN 106 to PCF 111 results in the release of the A10 bearer connection. The PDSN 106 is modified to send a A11-registration update message 151 including session parameters such as the inactivity timer for a the packet data service accessed by mobile station 10. PDSN sends an inactivity timer for each packet data connection requested by the mobile. PDSN 106 also initiates a timer TSESUPD.

PDSN 106 will generate this message 151 and transmit it to the PCF 111. The parameters transmitted may include an inactivity timer, quality of service (QoS) parameters and/or other packet data session parameters. The inactivity timer and/or other parameters are transmitted in a normal vendor/organization specific extension (NVSE) element. See FIG. 3.

Figures 3, 4:
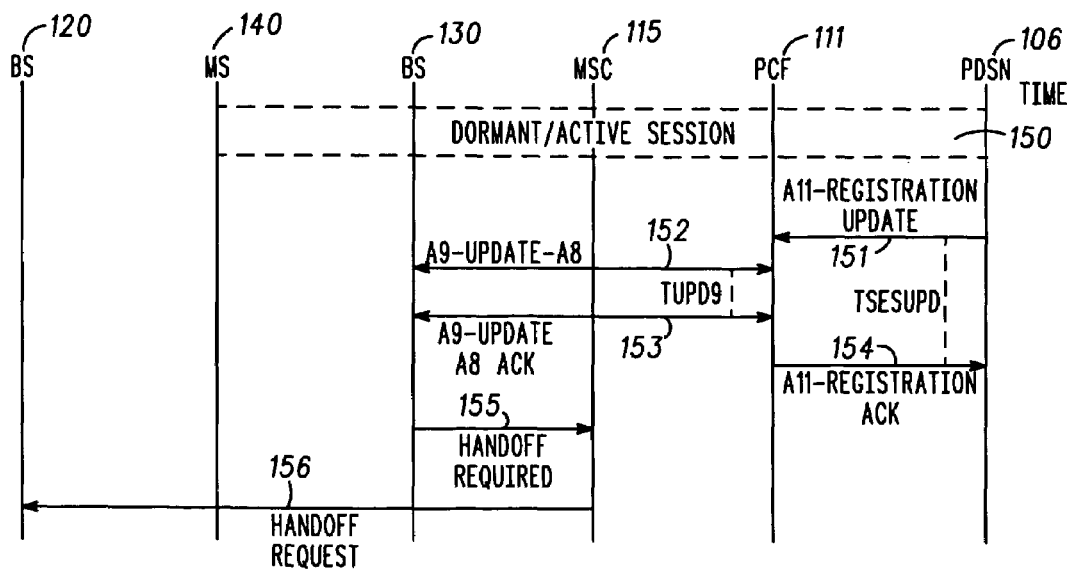
FIG. 3 is a data layout diagram of an A11 registration update message in accordance with a preferred embodiment of the present invention.
FIG. 4 is a message flow diagram of another embodiment of the present invention.

With reference to FIG. 3, the NVSE will have an application data field 205 in which the PDSN code will be set to 20H (hexadecimal) to indicate that the message is being sent to update a packet data connection as opposed to releasing a connection which is the present function of this message. The PDSN CODE value of 20H is new and indicates a packet data connection update. The NVSE 200 is shown. The application subtype field 207 will indicate the packet data session parameter transmitted is a packet data inactivity timer. The application data field will indicate the value of the inactivity timer 209.

Referring again to FIG. 2, PCF 111 is modified such that when it receives the A11-Registration Update message 151 with a PDSN code of 20H, it will refrain from tearing down the connection between it and the PDSN 106.

Figure 5:
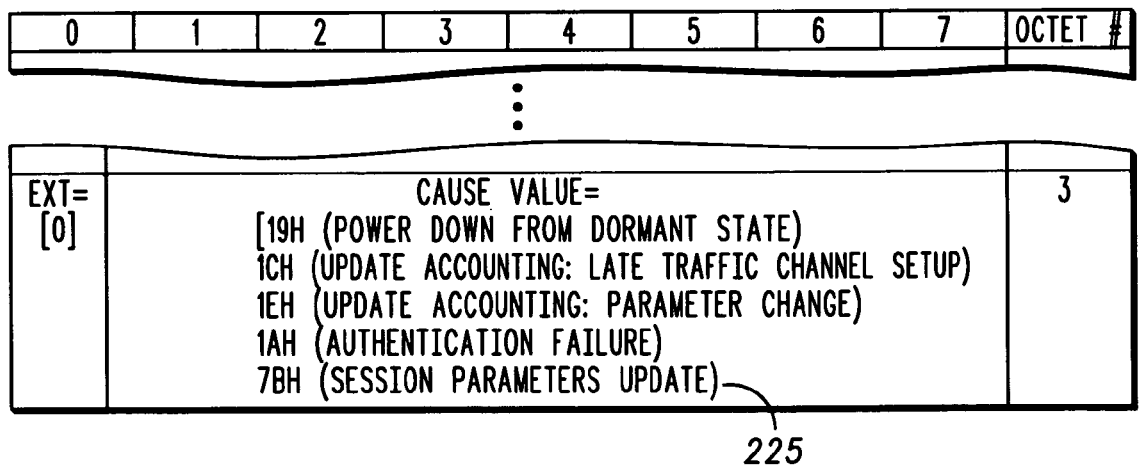
FIG. 5 is a data layout diagram of a cause value portion of an A9 update A8 message in accordance with a preferred embodiment of the present invention.

Typically, the A9-update-A8 message is transmitted from base station 130 to the PCF 111. In the preferred embodiment of this invention, this message 152 becomes a bi-directional message and PCF 111 will transmit this message 152 to base station 130. The A9-update-A8 message 152 is now used to transfer or update packet session related parameters from PCF 111 to base station 130. These parameters include the inactivity timer and/or other packet data session parameters such as quality of service (QoS) parameters. A new session parameters element is added to the A9-update-A8 message to carry the new or updated parameters. A new cause value 225 of the A9 update A8 message 152, see FIG. 5, (session parameters update=7B hexadecimal) indicating the purpose of the message 152 is also added. The A9 -update-A8 message 152 is then transmitted from PCF 111 to base station 130. PCF 111 also initiates a timer TUPD9. An A8 bearer connection between base station 130 and PCF 111 is not required to support the preferred embodiment.

The A9-update-A8 ACK message is typically transmitted from PCF 111 to base station 130 and it acknowledges the A9-update-A8 message. In the preferred embodiment of the invention, the A9-update-A8 ACK message 153 is modified to be a bi-directional message. The message 153 will be transmitted from base station 130 to PCF 111 in response to the A9-update-A8 message sent in the reverse direction. The A9-update-A8 ACK message will be transmitted from base station 130 to PCF 111. PCF 111 then stops timer TUPD9. Then, PCF 111 sends an A11 registration ACK message 154 to PDSN 106.

If the BS 130 responds with an indication in the A9-Update-A8 ack message to the PCF 111 that the new or updated session parameter was not recognized or rejected for some reason, the PCF 111 indicates this to the PDSN 106 in the A11-Registration ack message.

If the PCF 111 fails to respond with A11-Registration Ack message to the PDSN 106 initiated packet setup, PDSN 106 shall assume that the session update procedure failed. The PDSN 106 may attempt to resend the A11-Registration Update message to the PCF 111 a configurable number of times.

As can be seen in the above explanation, with minimal modifications to the PDSN 106, PCF 111 and base station 130, a packet data inactivity timer, or any other packet data session parameters such as quality of service parameters, etc. may be transferred from the packet data serving node to the radio access network. Prior to these modifications which are a preferred embodiment of the present invention, no such transmission of system parameters was possible. When implemented, the AAA based inactivity timer feature can be retrofitted to existing RANs and PDSNs. By adding new fields to existing messages and making other messages bi-directional, a great benefit of parameter passage between packet data serving nodes and mobile radio access networks is achieved. A further benefit is that retrofit of existing packet data server serving nodes and RANs is readily accomplished by adding the PDSN code element to the A11-Registration Update message in previous versions of the standard.

If a PCF running an older version of software which does not support PDSN initiated session updates, as described above, receives an A11-Registration Update message from the PDSN with a code value indicating session update, the PCF shall reject the session update attempt by ignoring the message, but shall not release the packet data session.

Further, If a PCF or BS does not recognize the new or updated session parameter from the PDSN, the PCF shall indicate this to the PDSN in the A11-Registration ack message.

If a handoff of mobile station 140 occurs, base station 130 transmits to call controller/mobility manager 117 of MSC 115 a handoff required (HO-REQ) message 155. Referring to FIG. 4, this message flow scenario is shown. The message flow scenario of FIG. 4 is the same as FIG. 2 for steps 150 through 154. Mobile station 140 may be in a dormant or active state. The modified A11 registration update message 151 is transmitted from PDSN 106 to PCF 111. A modified A9-update-A8 message 152 is sent from PCF 111 to base station 130. A modified A9-update-A8 ACK message 153 is transmitted from base station 130 to PCF 111. The A11 registration ACK message 154 is then sent from PCF 111 to PDSN 106.

Base station 130 transmits the handoff required message to call controller/mobility manager 117 of MSC 115 along with a new element including a packet data inactivity timer and/or other packet data session parameters such as QoS in the handoff required message 155. Base station 130 then becomes the source base station. The source base station 130 passes the inactivity parameter or other packet session parameters such as QoS along with it to the MSC. The MSC manager 117 then generates a handoff request (HO-REQUEST) message 156 which is transmitted to target base station 120. The handoff request message 156 includes the inactivity timer or other system parameter such as quality of service information.

As can be seen, with minimal modification to source base station 130 to forward the packet data inactivity timers, MSC 115 to forward this modified handoff required message and target base station 120 to receive and process this modified handoff request message 15. This modification has minimal impact on existing radio access elements and mobile switching center elements. Further, existing handoff request messages 156 are modified to include the inactivity timer and/or any updated session parameters, such as quality of service.

The above-mentioned modifications are easily retrofitable to the existing RAN and mobile switch equipment to further enhance the transmission of system parameters during a handoff. These modifications are relatively easily implemented in the various elements mentioned. Further, the mobile communication system so modified allows the system parameters including the inactivity timers, to be passed into the RAN from packet data serving nodes without tearing down the connections that, according to standards, would normally be torn down.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. In a radio access network (RAN), a method for transmitting at least one packet data session parameter from a packet data serving node (PDSN) to a packet control function (PCF), the RAN including a base station (BS), the method comprising:

establishing a dormant/active session from a mobile station (MS) to the PDSN through the RAN and the PCF;

obtaining by the PDSN for the at least one packet data service, the least one packet data session parameter;

transferring by the PDSN a session update message including the at least one packet data session parameter to the PCF without loss of a link between the packet data serving node and the radio access network;

determining by the BS that a handoff is required; and sending by the BS a handoff required message including the at least one packet data session parameter for each packet data service supported by the MS to a mobile switching center (MSC).

2. The method of claim 1, wherein there is further included the step of sending by the MSC a handoff request message including the at least one packet data session parameter associated with each service to a second base station.

3. The method of claim 1, wherein the at least one packet data session parameter comprising a packet data service inactivity timer, and wherein there is further included the step of maintaining the packet data service inactivity timer associated with the at least one packet data service supported by a call.

4. The method of claim 3, further comprising:

transmitting a first update message from the packet data serving node to the packet control function; and transmitting a second update message from the packet control function to the base station.

5. The method of claim 4, further comprising:

responsive to the step of transmitting the second update message, transmitting a second update message acknowledgment from the base station to the packet control function; and responsive to the step of transmitting the second update message, transmitting a first update message acknowledgment from the packet control function to the packet data server.

6. The method of claim 1, wherein the at least one packet data session parameter comprising a quality of service (QoS) parameter.

7. In a radio access network (RAN), a method for transmitting at least one packet data session parameter from a packet data serving node (PDSN) to a packet control function (PCF), the RAN including a base station (BS), the method comprising:

establishing a dormant/active session from a mobile station (MS) to the PDSN through the RAN and the PCF;

obtaining by the PDSN for the at least one packet data service, the least one packet data session parameter wherein the at least one packet data session parameter comprising a packet data service inactivity timer;

transferring by the PDSN a session update message including the at least one packet data session parameter to the PCF;

determining by the BS that a handoff is required;

sending by the BS a handoff required message including the at least one packet data session parameter for each packet data service supported by the MS to a mobile switching center (MSC); and maintaining the packet data service inactivity timer associated with the at least one packet data service supported by a call.

8. The method of claim 7, further comprising:

transmitting a first update message from the packet data serving node to the packet control function; and transmitting a second update message from the packet control function to the base station.

9. The method of claim 8, further comprising:

responsive to the step of transmitting the second update message, transmitting a second update message acknowledgment from the base station to the packet control function; and responsive to the step of transmitting the second update message, transmitting a first update message acknowledgment from the packet control function to the packet data server.

* * * * *